L. HENSCHEL.
BUTTONHOLE CUTTING MACHINE.
APPLICATION FILED OCT. 11, 1917.
1,289,759.
Patented Dec. 31, 1918.
2 SHEETS—SHEET 1.
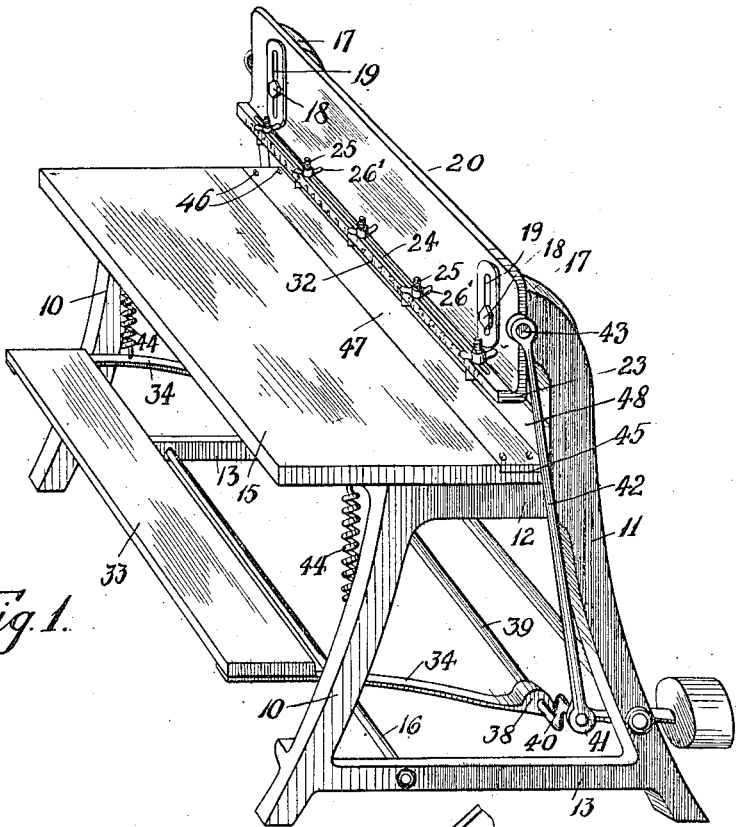
Fig. 1.
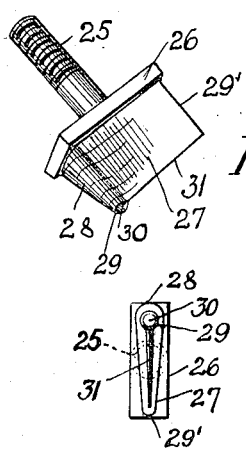
Fig. 5.
Fig. 6.
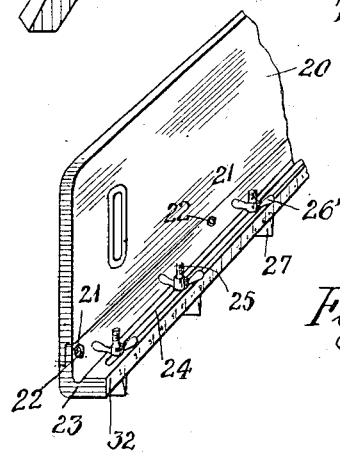
Fig. 4.
Inventor
Lipman Henschel
By his Attorney
Alexander Diner

L. HENSCHEL.
BUTTONHOLE CUTTING MACHINE.
APPLICATION FILED OCT. 11, 1917.

1,289,759.

Patented Dec. 31, 1918.
2 SHEETS—SHEET 2.

Inventor
Lipman Henschel
By his Attorney
Alexander Innes

UNITED STATES PATENT OFFICE.

LIPMAN HENSCHEL, OF NEW YORK, N. Y.

BUTTONHOLE-CUTTING MACHINE.

1,289,759.  Specification of Letters Patent.  Patented Dec. 31, 1918.

Application filed October 11, 1917. Serial No. 196,074.

*To all whom it may concern:*

Be it known that I, LIPMAN HENSCHEL, a citizen of the United States, residing at New York, in the county of New York and State of New York, have invented new and useful Improvements in Buttonhole-Cutting Machines, of which the following is a specification.

This invention relates to machines for operating upon garments, and the principal objects of the invention are:—(1) to provide a machine adapted to cut button-holes in garments; (2) to provide a machine adapted to cut button-holes in a number of garments during one operation, if desired; (3) to provide a machine having cutting devices independently adjustable in such manner that button-holes may be cut in the garment at spaced intervals from each other, as desired; (4) to provide a machine having interchangeable cutting devices differing in size in order to produce button-holes differing in size; and (5) to provide a machine having parts so arranged that the button-holes may be cut out of alinement.

With these and other objects in view, the invention resides in the details of construction and in the arrangement and combination of parts hereinafter described and shown in the accompanying drawings, forming a part of this specification, and in which:—

Figure 1 is a view in perspective of the machine.

Fig. 4 is a perspective view, showing a fragmentary portion of the reciprocating plate and head with the cutting devices supported thereby.

Fig. 5 is a view in perspective of a cutting device.

Fig. 6 is an underneath plan view of a cutting device.

Figure 2:
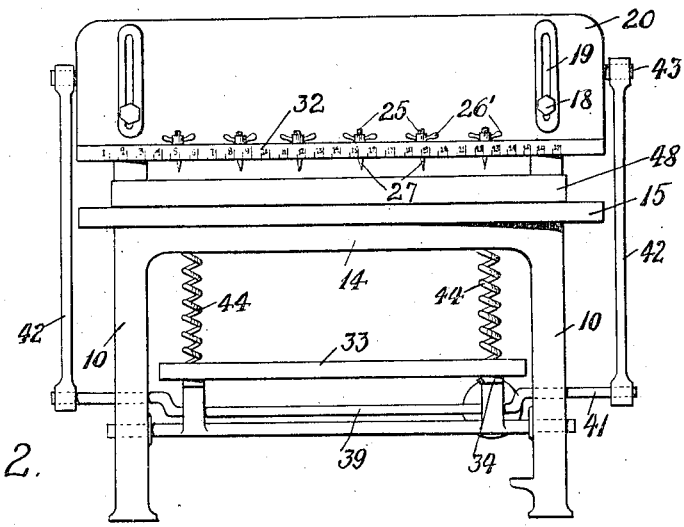
Fig. 2 is a view in front elevation of the machine.
Figure 3:
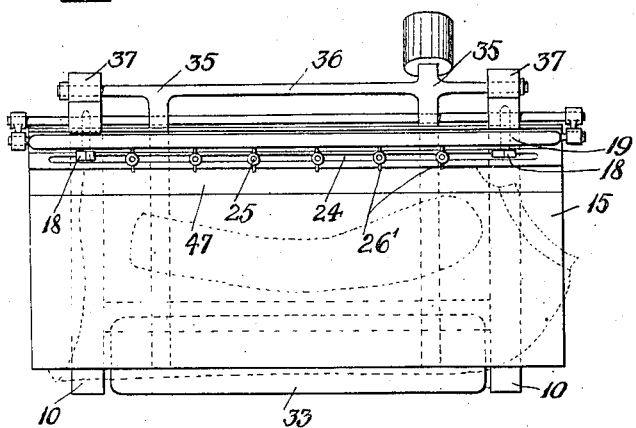
Fig. 3 is a top plan view of the machine.

The framework for the support of the cutting table and operating parts may be made in any form or style suitable for the purpose, and of either wood or iron. In the embodiment of the invention herein shown, the framework consists of two identical standards having front legs 10 and rear legs 11, connected by upper and lower cross pieces as 12 and 13. Connecting the legs 10 and 11 of one standard with the corresponding legs of the other standard are longitudinal members as 14, the upper sides of which are flush with the cross pieces 12 in order to provide in the same horizontal plane suitable supports upon which to secure the horizontal cutting table 15. The lower portions of the standards are braced with respect to each other by a longitudinal strip 16 which connects the lower cross pieces 13.

In Fig. 1 it will be noted that the rear legs 11 extend upwardly for a distance above the cutting table 15, terminating in forwardly projecting portions or arms 17 having vertical ends, into which are suitably threaded or otherwise secured the headed guiding screws 18, which pass through suitably shouldered slots 19, formed upon the plate 20, it being observed in this connection that the screws 18 are so secured to the arms 17 that the heads of the said screws are spaced sufficiently from the vertical ends of said arms as to allow the plate 20 to be given free reciprocating vertical movement.

Removably secured by bolts and nuts as 21 and 22 to the lower end of the plate 20 is an angular head 23, which is provided vertically therethrough with a longitudinal slot 24, receptive of threaded stem ends as 25 of the button-hole cutting devices or shoes as 26, which are secured in an obvious manner in the spaced positions desired by means of applying wing nuts as 26' to the threaded ends 25.

Each of the cutting devices 26 is provided with a blade 27, which is formed at one end with a tapering preferably rounded heel portion 28, terminating in an approximately circular cutting edge 29, the aperture or opening 30 formed in the heel extending vertically therethrough. The remainder of the blade 27 tapers toward a straight cutting edge 31, the blade also preferably tapering from the said heel 28 toward the opposite end 29'. In this manner I provide a blade 27 having a cutting edge of the same form as the conventional button-hole which is adapted to cut a button-hole in one garment alone or in a number of garments. These cutting blades 27 may be made in various sizes in order to produce the desired different sizes of button-holes, it being noted here that shoes as 26 carrying the different sizes of blades may be readily removed and as readily applied to the slotted head 23 by the proper manipulation of the wing nuts 26'.

In order to provide for the convenient and exact spacing apart of the devices as 26 so as to cut button-holes in the garment at the proper intervals desired, I provide the front face of the head 23 with a suitable measuring scale or rule 32, which may consist of a series of consecutive numbers indicative of suitable divisions of lengths. Thus the scale may consist of inch units arranged in serial or consecutive order, together with any suitable fractional parts thereof.

For the operation vertically of the plate 20, I prefer to employ foot operated mechanism comprising a treadle board 33, which is supported upon the parallel forwardly extending arms 34 connected as at 35 with a rock shaft 36, journaled at its opposite ends in bearings as 37 suitably provided near the lower ends of the rear legs 11. In advance of the legs 11, the arms 34 are preferably formed with enlarged portions or shoulders as 38, in which is rigidly engaged a connecting rod 39, the outer ends of which are preferably bent upwardly at an angle as at 40 terminating in studs as 41, upon which are pivotally engaged the connecting rods 42, the upper ends of which are pivotally engaged upon studs 43 suitably projecting from the opposite ends of the plate 20.

Coil pull springs as 44 are employed to connect the arms 34 with the front cross piece 14 in order normally to hold the treadle 33 in elevated position, the said springs yielding in an obvious manner to permit the treadle under the manipulation of the foot or weight of the operator to be lowered. In view of the mechanism described, it will be understood that when the treadle 33 is in elevated position, the connecting rods 42 will hold the plate 20 in elevated position, providing a space between the lower side of the head 23 and the table 15, and similarly, that when the treadle 33 is depressed, the said plate 20 will be drawn downwardly, bringing the cutting blades 27 into quick engagement with the garment arranged underneath.

Directly underneath the cutting devices, I prefer to provide the table 15 with a longitudinal recess as 45, into which may be fitted and secured by screws as 46, or other suitable means, a slab or length of metal 47, made preferably of relatively soft metal as brass, or other substance material, adapted to provide a substantially firm base for the cloth which is to be cut, and yet adapted to yield sufficiently under the thrusts of the cutting knives without turning the edges thereof. At the rear of the slab or length 47, I prefer to secure in any suitable manner to the rear legs as 11, a vertical guide wall 48, against which the cloth or garment may abut thereby enabling the button-hole to be cut at the proper distance from the edge thereof.

Figure 7:
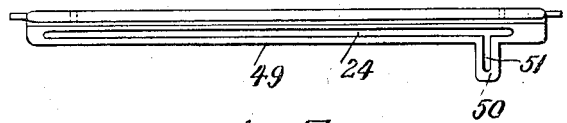
Fig. 7 is a plan view of a modified form of supporting head for the cutting devices.

In Fig. 7, I illustrate another form 49 of the vertically slotted head. This form is similar to that of the head 23 in all respects, except that it is made with a forward projection as 50, having a slot 51 of the same size as the slot 24, and like 24, receptive of the threaded end of a cutting device 26. The purpose of a slotted projection as 50 is to enable a cutting device to be arranged out of alinement in order that, when desired, a button-hole, for instance, a top button-hole, may be cut at a greater distance from the edge than the other button-holes, it being often necessary in cutting button-holes in various types of garments to set the first or top one inwardly upon the goods in order to compensate for a proper buttoning of the garment.

Having thus described my invention, what I claim is:—

1. In a machine for cutting buttonholes in garments, the combination of a supporting frame and a horizontal cutting table carried thereby, the rear legs of the frame extending above the cutting table and projecting thereover terminating in vertical ends, a plate supported by said ends for vertical movement, means carried by said plate for cutting a plurality of buttonholes in a straight row, and treadle operated means carried by the frame and connected with said plate whereby to reciprocate the latter vertically.

2. In a machine for cutting buttonholes in garments, the combination of a pair of connected standards, a horizontal cutting plate supported thereon, the rear legs of the standards extending above said cutting plate and projecting thereover terminating in vertical ends, a plate slidably supported on said ends for vertical movement, an angular head carried by said plate, interchangeable cutting devices carried by said angular head and adapted to cut a plurality of button-holes in a straight row, and treadle operated means carried by the standards and connected with said plate whereby to reciprocate the latter.

3. In a machine for cutting buttonholes in garments, the combination of connected standards, a horizontal cutting plate supported thereon, the rear legs of the standards extending above said cutting plate and projecting forwardly thereover terminating in vertical ends, a plate slidably supported against said ends for vertical movement, devices carried by said plate for cutting button-holes differing in size, treadle operated means supported by the standards and connected with said plate whereby to reciprocate the latter, and yielding means for normally maintaining said treadle operated means in such position that the cutting devices are held spaced above the cutting table.

4. In a machine for cutting button-holes in garments, the combination of connected standards and a horizontal cutting plate supported thereon, the rear legs of the standards extending above said cutting plate and projecting thereover terminating in vertical ends, a plate slidably supported against said ends for vertical movement, an angular head removably carried by said plate, interchangeable cutting devices carried by said head, one of which is carried in offset relation with respect to the others, and treadle operated means carried by the standards and connected with said plate whereby to reciprocate the latter.

5. In a machine for cutting button-holes in garments, the combination of connected standards and a horizontal cutting plate supported thereon, the rear legs of the standards extending above said cutting plate and projecting thereover terminating in vertical ends, a plate slidably supported against said ends for vertical movement, an angular head removably carried by said plate, a plurality of interchangeable cutting devices carried by said head, one of which is carried in offset relation with respect to the others, treadle operated means carried by the standards and connected with said plate whereby to reciprocate the latter, and yielding means for normally maintaining said treadle operated means in such position that the angular head is held spaced above the cutting plate.

6. In a machine for cutting button-holes in garments, the combination of connected standards and a horizontal cutting plate supported thereon, the rear legs of the standards extending above said cutting plate and projecting forwardly thereover terminating in vertical ends, a plate slidably secured against said ends for vertical movement, a plurality of cutting devices carried by said plate one of which is in offset relation with respect to the other, and a guide bar carried by said projecting legs above said table to define the position of the garment to be operated upon with respect to the cutting devices.

In testimony whereof I have signed my name to this specification.

LIPMAN HENSCHEL.

Copies of this patent may be obtained for five cents each, by addressing the "Commissioner of Patents, Washington, D. C."